Figure 1:
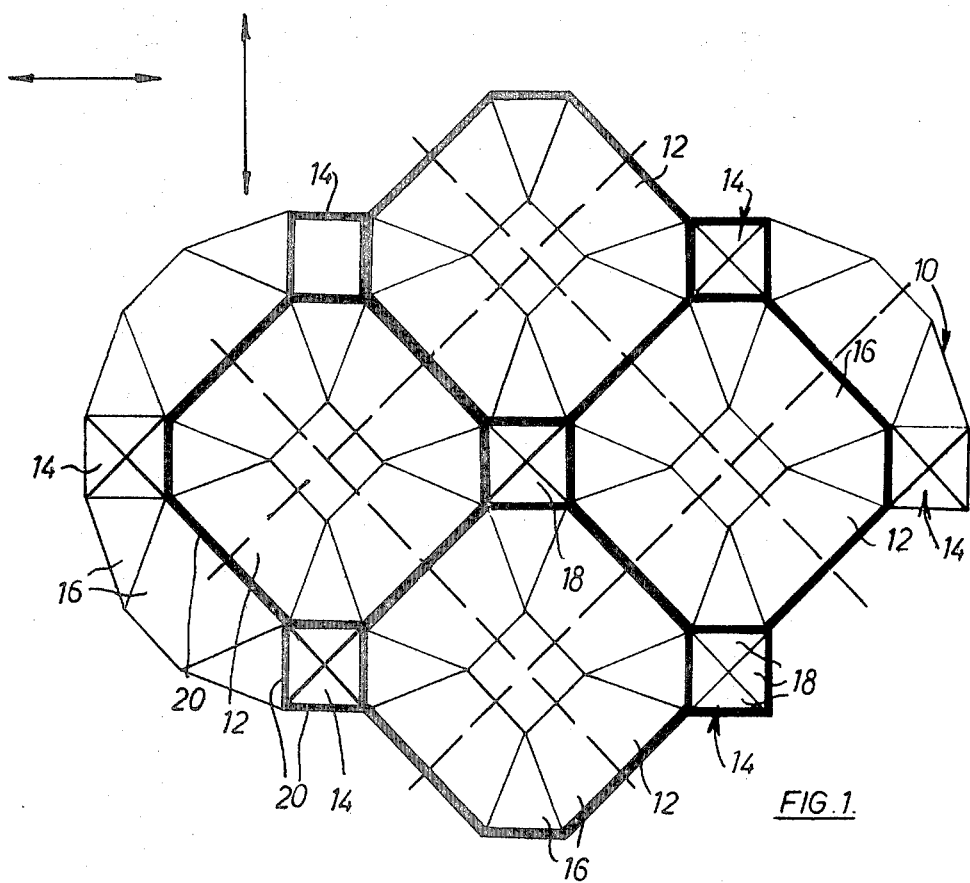

United States Patent

[11] 3,616,154

[72] Inventors James Dow
Thaxted, Essex;
Albert George Patchell, Welwyn Garden City; Ronald Lloyd, Sawbridgeworth, all of England
[21] Appl. No. 807,884
[22] Filed Mar. 17, 1969
[45] Patented Oct. 26, 1971
[73] Assignee T. J. Smith & Nephew Limited
Hull, England
[32] Priority Mar. 20, 1968
[33] Great Britain
[31] 13411/68

[54] NONWOVEN OPENWORK NET STRUCTURE OF THERMOPLASTIC MATERIAL
10 Claims, 8 Drawing Figs.
[52] U.S. Cl..................................... 161/113,
161/138, 264/154, 264/289
[51] Int. Cl...................................... B32b 3/10
[50] Field of Search.......................... 161/89,
130–131, 109, 117, 122, 113, 138; 264/289, 293, 288, 154

[56] References Cited
UNITED STATES PATENTS

| | | | |
|---|---|---|---|
| 3,137,746 | 6/1964 | Seymour et al................ | 264/73 |
| 3,387,077 | 6/1968 | Sammons et al.............. | 161/89 X |
| 1,984,653 | 12/1934 | Palmer et al.................. | 161/131 X |
| 2,958,148 | 11/1960 | Sylvester et al............... | 264/293 X |

Primary Examiner—Philip Dier
Attorney—Singer, Stern & Carlberg

ABSTRACT: A nonwoven netlike openwork structure of thermoplastic material is provided, comprising a plurality of bosses arranged in a plurality of rows extending substantially uniformly throughout the structure, substantially all of which bosses are integrally joined to at least two other such bosses by bands of thermoplastic material, said bosses being of at least two different configurations, and the area of the structure between the bosses and the bands being substantially devoid of thermoplastic material. If desired the structure may also include portions in which all the bosses are of substantially the same configuration.

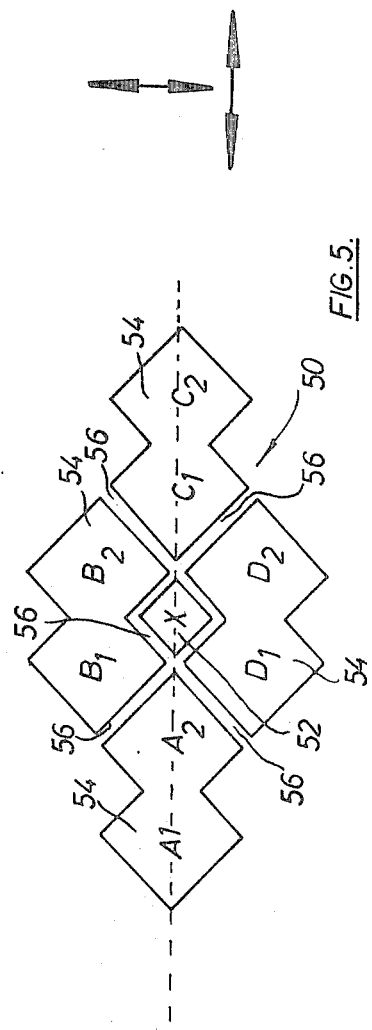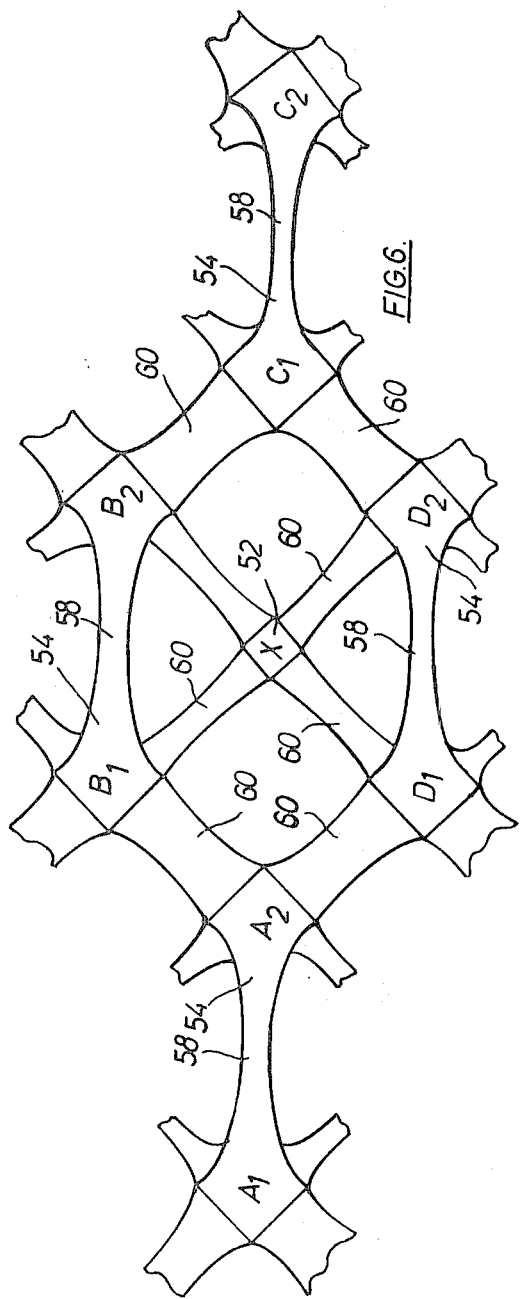

NONWOVEN OPENWORK NET STRUCTURE OF THERMOPLASTIC MATERIAL

The present invention relates to a netlike openwork structure of a thermoplastic material and to methods for the production of such an openwork net.

According to one embodiment of the present invention there is provided a nonwoven netlike openwork structure of thermoplastic material, comprising a plurality of bosses arranged in a plurality of rows extending substantially uniformly throughout the structure, substantially all of which bosses are integrally joined to at least two other such bosses by bands of thermoplastic material, said bosses being of at least two different configurations, and the area of the structure between the bosses and the bands being substantially devoid of thermoplastic material.

Preferably substantially all of said bosses are integrally joined to at least four other such bosses by bands of thermoplastic material.

Where reference is made to bosses of different configuration it is intended that the bosses may be different in at least one, and preferably all, of the following features, viz, shape, size and thickness.

It will be clearly understood that where reference is made throughout the specification, including the claims, to the rows of bosses extending "substantially uniformly" it is not intended that each row of bosses is identical, but that, where all the rows are not identical, the rows are arranged in a repeating pattern.

In some embodiments of the invention the bands may be of two or more different thicknesses depending upon the material from which they are produced. For example some of the bands may be of one thickness and the remainder of the bands may be of another thickness.

In one preferred embodiment of the present invention the netlike openwork structure comprises a plurality of octagonally shaped bosses arranged in a regular pattern one at each intersection of an imaginary squared lattice or grid and a plurality of square-shaped bosses, arranged in a regular pattern one at the center of each square of said imaginary lattice or grid.

In this preferred form of the invention, each of the square-shaped bosses is connected to four adjacent octagonally shaped bosses and each octagonally shaped thickened area is connected to four square-shaped bosses, and to four octagonally shaped bosses.

In another preferred embodiment the netlike openwork structure comprises a regular pattern of octagonal bosses, hexagonal bosses and square bosses all interconnected by bands of thermoplastic material.

In yet a further preferred embodiment the netlike openwork structure comprises a regular pattern of a plurality of square bosses and a plurality of bosses each of which is shaped like two squares spaced apart but joined by a connecting piece.

In a further preferred embodiment of the invention the netlike openwork structure comprises a regular pattern of bosses of two different configurations, the bosses of one configuration being approximately square and each being integrally connected by bands to eight smaller substantially square bosses, each of said smaller bosses being integrally connected to two of said larger bosses and to two said smaller bosses.

An openwork structure of the present invention may in one embodiment be produced by the biaxial stressing of a sheet of thermoplastic material having a regular pattern of bosses of at least two different configurations on at least one surface thereof, until the material takes on a degree of permanent set and splits occur in the thinner material.

The openwork structure of the invention may in another embodiment be produced by biaxially stressing a sheet of thermoplastic material having a regular pattern of separate bosses of at least two different configurations on at least one surface thereof, until the material takes on a degree of permanent set and splits occur in the thinned material.

In yet a further embodiment the openwork structure of the invention may be produced by biaxially stressing a sheet of thermoplastic material comprising at least one portion having a regular pattern of bosses of at least two different configurations on at least one surface thereof and at least one other portion having a regular pattern of substantially identical bosses on at least one surface thereof until the material takes a degree of permanent set and splits occur in the thinned material.

The material in between these bosses on biaxial stressing, splits to form the connecting strands. The biaxial stressing may be carried out sequentially or simultaneously and the two directions of stretch are preferably at right angles.

In one form the thermoplastic starting material may be formed with bosses raised above the surface of the sheet material. Alternatively the sheet may have a plurality of cavities formed therein, in such a manner as to leave a plurality of portions or bosses which are of full thickness of the sheet.

Various methods of sequentially and simultaneously stressing the thermoplastic material to form the openwork structure of the present invention are described in Patent specifications Nos. 914,489; 1,055,963 and 1,075,487. These methods may be adapted to produce material of the present invention.

According to another embodiment of the present invention there is provided a nonwoven netlike openwork structure of thermoplastic material, comprising at least one portion having a plurality of bosses arranged in a plurality of rows extending substantially uniformly throughout said at least one portion, substantially all of which bosses are integrally joined to at least two other such bosses by bands of thermoplastic material, said bosses being of at least two different configurations; and at least one other portion having a plurality of bosses arranged in a plurality of rows extending substantially uniformly throughout said at least one other portion, substantially all of which bosses are integrally joined to at least two other such bosses by bands of thermo plastic material, all said bosses in said at least one other portion being of substantially the same configuration; and the area of the structure between the bosses and the bands being substantially devoid of thermoplastic material.

According to the last described embodiment openwork structures may thus be formed having areas of differing degrees of openness thereby allowing the formation of openwork structures of lacelike appearance.

In this latest embodiment, the structure of the portion or portions having bosses of at least two different configurations (i.e. the irregular part of the openwork structure is preferably as described in the above preferred embodiment of the invention. The portion or portions having bosses of substantially identical configuration (i.e. the regular part of the structure) may be produced from portions of starting material having a configuration similar to the starting materials described in G. B. Patent specifications Nos. 914,489; 1,055,963 and 1,075,487 i.e. material having a plurality of embossments on or cavities in at least one surface thereof, Each boss in said at least one other portion is preferably integrally joined to four or six other such bosses by bands of thinner material.

It will be apparent that in all versions of the invention the starting material may if desired include a mixture of bosses, raised above at least one surface of the sheet material, and cavities formed in at least one surface of the sheet material.

The openwork structures, of the present invention have many uses including use for decorative purposes e.g. as curtain material and as table clothes etc.

Figure 2:
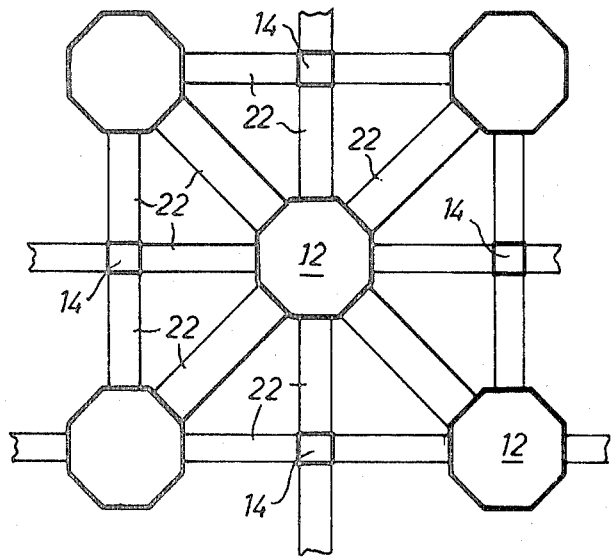
Figure 3:
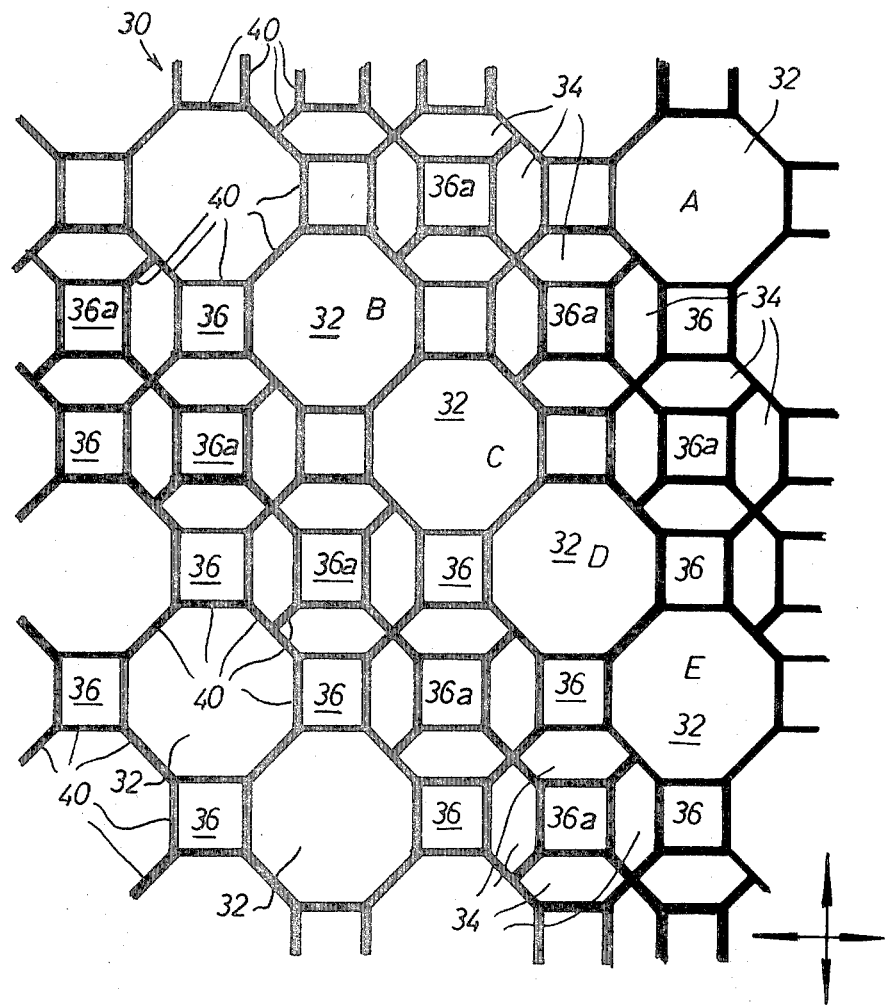
Figure 4:
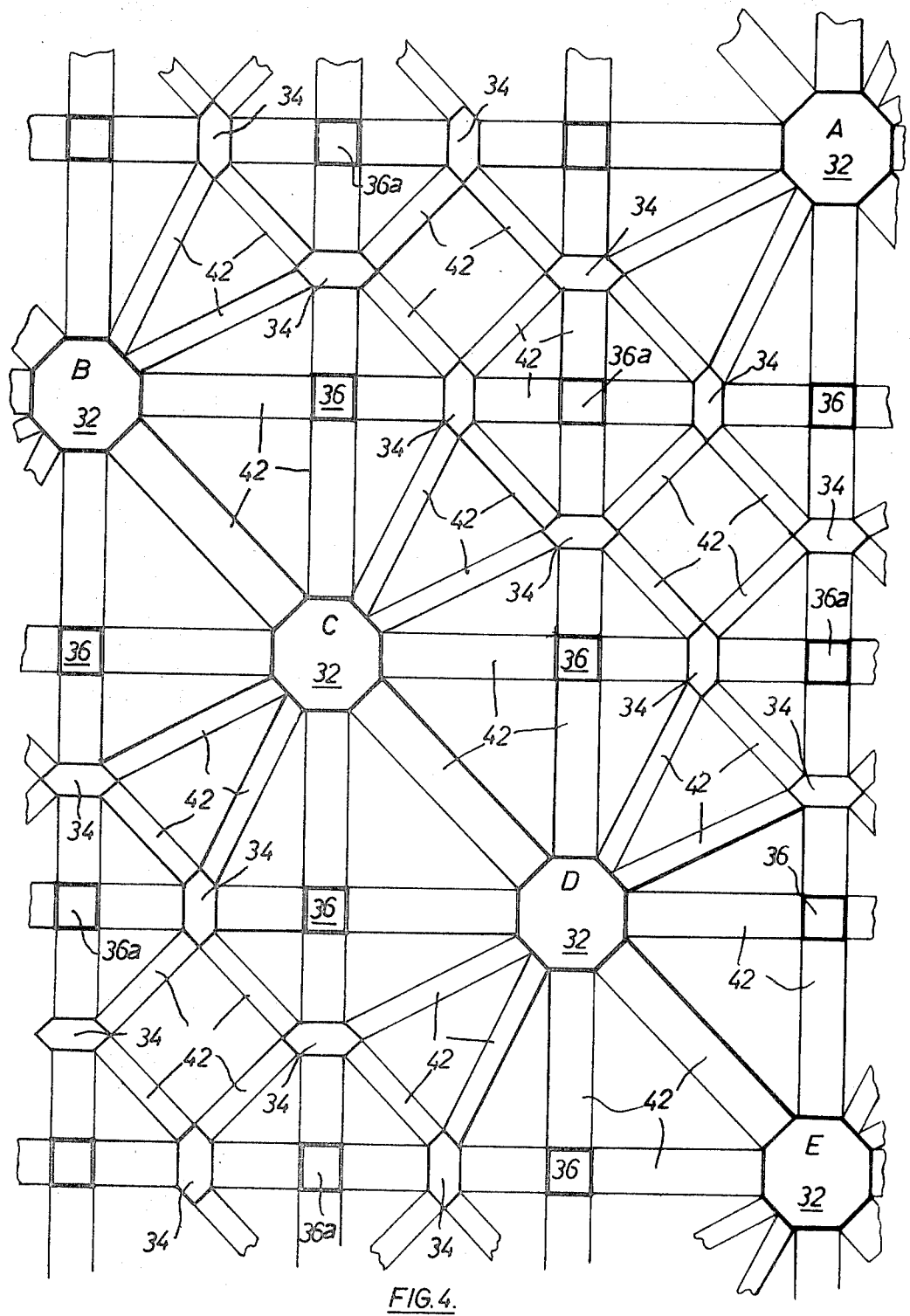
Figure 7:
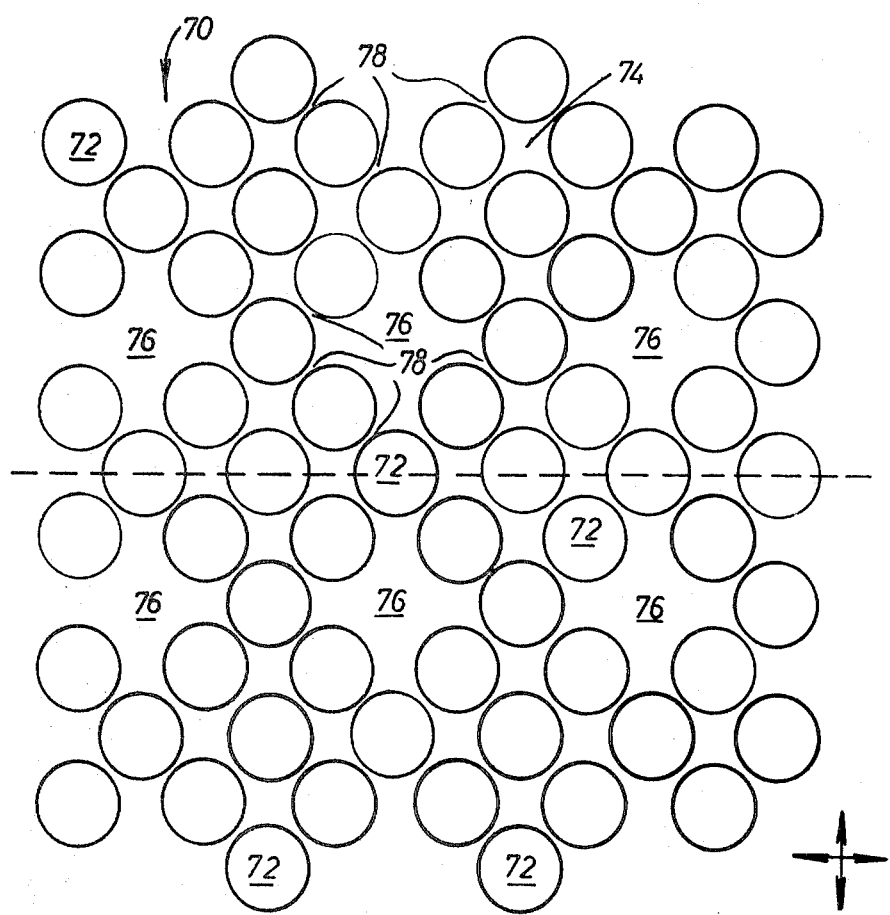
Figure 8:
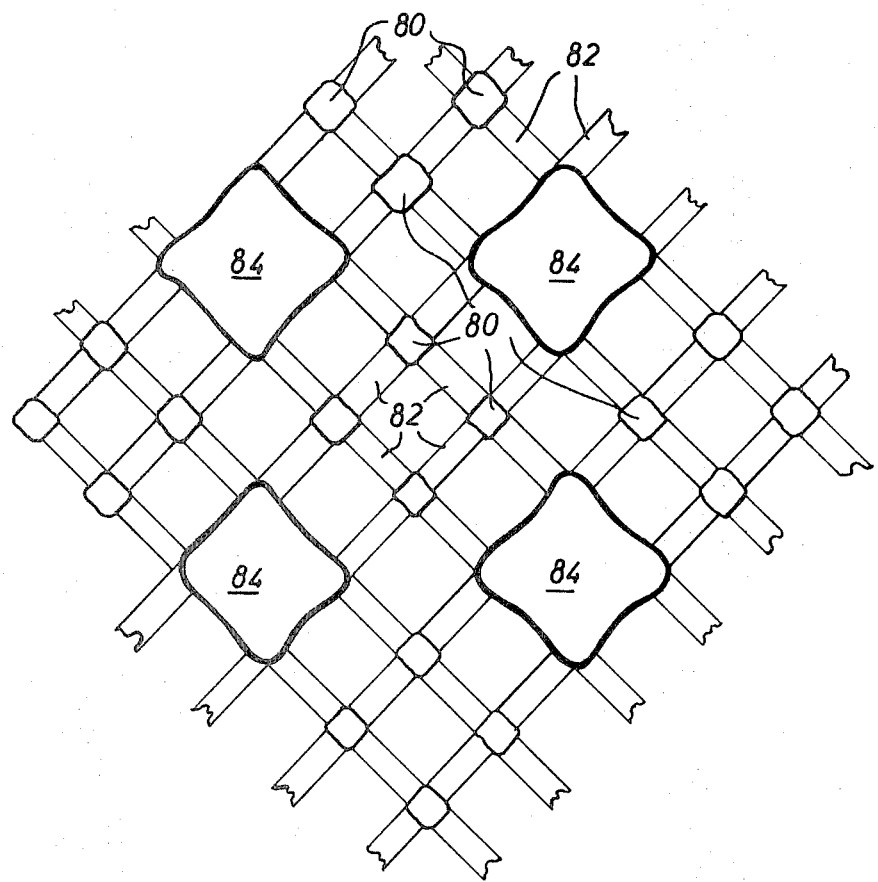

The present invention will now be described by way of example with reference to the accompanying drawings, in which:

FIG. 1 is a plan view of part of a sheet of thermoplastic material from which an openwork structure of the present invention may be produced, FIG. 2 is part of an openwork structure produced from sheet material shown in FIG. 1, FIG. 3 is a plan view of part of a sheet of thermoplastic material from which another openwork structure of the present invention may be produced, FIG. 4 is part of an openwork structure produced from the sheet material shown in FIG. 3, FIG. 5 is a plan view of part of a sheet of thermoplastic material from which yet another openwork structure of the present invention may be produced, FIG. 6, is part of an openwork structure produced from the sheet material shown in FIG. 5, FIG. 7 is a plan view of a part of a sheet of thermoplastic material from which a further openwork structure of the invention may be produced, and FIG. 8 is an openwork structure produced from sheet material.

Referring to FIG. 1 of the drawings, a sheet of thermoplastic material 10 has formed thereon allover pattern of a plurality of octagonal-shaped bosses, 12, arranged in a regular pattern, one at each intersection of an imaginary squared lattice or grid (shown in dotted lines) and a plurality of square-shaped bosses 14 located one at the center of each of the squares of said imaginary lattice. Each octagonal-shaped boss 12 is of symmetrical shape, alternate sides being of shorter and longer length. Each of the shorter sides of the octagonal-shaped bosses 12 is the same length as the sides of the square-shaped bosses 14 and is located adjacent to and facing one of the sides of a square-shaped boss 14. Each of the longer sides of each octagonal-shaped boss 12 is located adjacent to and facing one of the longer sides of an adjacent octagonal-shaped boss 12. The distance between the centers of two adjacent octagonal-shaped bosses is 0.040 inches and each side of the square-shaped boss is 0.010 inches long. The sides 16 of the octagonal-shaped bosses 12, and the sides 18 of the square-shaped bosses, slope such that the base of each boss is of greater area than the most raised portions thereof. The bosses may be formed in the thermoplastic material using a profiled roller rotating on an axis at 45° to the dotted lines indicating the lattice or grid. Each of the bosses is surrounded by an area of material 20, which is thin by comparison with the embossed portions.

To produce the openwork structure shown in FIG. 2, the sheet material shown in FIG. 1 is biaxially stressed either sequentially or simultaneously in the directions of the two arrows indicated in FIG. 1.

On biaxial stressing the thinner material 20 surrounding and joining the bosses becomes stretched to such an extent that it splits leaving bands 22 of material joining the bosses together. Each square-shaped boss 14 is connected by bands 22 to four octagonal-shaped bosses 12 and each octagonal-shaped boss 12 is connected by bands 22 to four square-shaped bosses 14 and four octagonal-shaped bosses 12.

Referring to FIG. 3 a sheet of thermoplastic material 30 has formed thereon an allover regular pattern of octagonal-shaped bosses 32, hexagon-shaped bosses 34, and square-shaped bosses 36 and 36a. The arrangement of the embossments is similar to that of FIG. 1 with the following two exceptions
 i. the octagonal-shaped bosses are regular
 ii. alternate octagonal-shaped bosses of the arrangement of FIG. 1 are divided into a central square-shaped boss 36a surrounded by four hexagonal-shaped bosses 34.

The bosses as in FIG. 1 may be formed in the thermoplastic material using a profiled roller rotating on an axis as indicated by the dotted line. Each of the bosses is surrounded by an area 40, which is thin by comparison with the bosses.

On biaxially stressing either simultaneously or sequentially in the direction of the two arrows, an openwork structure, such as that shown in FIG, 4, is produced.

To shown clearly the way in which the sheet material of FIG. 3 forms the openwork structure of FIG. 4, five octagonal bosses 32 have been marked A, B, C, D and E in FIG. 3 and these same five bosses are marked in a similar manner in FIG. 4.

It can be seen from FIG. 4 that each of the bosses is connected to a number of other bosses by bands 42 of thermoplastic material. Each octagonal-shaped boss 32 is connected by the bands 42 to two other octagonal-shaped bosses 32, four square-shaped bosses 36, and four hexagon-shaped bosses 34. Each square-shaped boss 36 is connected by bands 42 to two octagonal-shaped bosses 32, and two hexagonal-shaped bosses 34. Each square-shaped boss 36a is connected to four hexagonal-shaped bosses 34. Each hexagonal-shaped boss 34 is connected by bands 42 to one square-shaped boss 36, one square-shaped boss 36a, one octagonal-shaped boss 32 and three hexagonal-shaped bosses 34.

Referring to FIG. 5, a sheet of thermoplastic material 50 has formed thereon allover regular pattern (only part of which is shown) of bosses 52 and 54 of two different configurations. The bosses 52 are square in shape and the bosses 54 have the shape in plan view of two squares overlapping at the one corner. Each of the bosses is surrounded by an area 56 of thermoplastic material which is thin by comparison with the bosses 52, 54.

The bosses 52, 54 may be formed in the thermoplastic material using a profiled roller rotating on an axis as indicated by the dotted line.

On biaxial stressing either simultaneously or sequentially in the direction of the two arrows shown an openwork structure, such as that shown in FIG. 6, is produced.

To show clearly the way in which the sheet material of FIG. 5 forms the openwork structure of FIG. 6, the two ends of each of the four bosses 54 shown have been referenced $A_1A_2B_1B_2C_1C_2$ and $D_1D_2$ and the one square boss 52 shown has been referenced X.

In the openwork structure of FIG. 6 it can be seen that the two ends of each boss 54 have been moved apart and are joined by a connecting piece 58 which may be considered either as part of a single boss or as a band of material joining two bosses. Each end of bosses 54 is connected by bands 60 of thin material (thinner than connecting pieces 58) to one end of each of two other bosses 54 and to two sqaure-shaped bosses 52.

This particular arrangement provides an openwork structure in which in effect two bosses (i.e. the two ends of a boss 54) are produced from a single boss in the unstressed film, in which the bands 60 may be of different width and thickness to the connecting pieces 58 and in which connecting pieces 58 are formed from a part of a boss which on the unstressed film is of less width than other parts of the same boss.

Referring to FIG. 7, a sheet of thermoplastic material 70 has formed thereon an allover regular pattern of conical depressions 72 arranged in rows both 45° directions to the transverse direction of the sheet material, (indicated by dotted line). Any pair of adjacent rows consists of (i) a continuous row of conical depressions 72 and (ii) a row of conical depressions 72 where every fourth depression is omitted. This arrangement results in boss-forming areas 74 and 76 having the full thickness of the sheet material) of 2 distinct shapes. Boss forming areas 74 are of approximately square shape with the sides of the square slightly concave and are each surrounded by 4 strand-forming regions 78 of roughly triangular cross section.

Boss-forming areas 76 are of approximately maltese cross-shape and are each surrounded by 8 strand-forming regions 78 of roughly triangular cross section.

The pattern of conical depressions 72 may be formed in the thermoplastic material using a profiled roller rotating on an axis as indicated by the dotted line.

On biaxial stressing either simultaneously or sequentially in the direction of the 2 arrows shown, an openwork structure such as shown in FIG. 8 is produced. During the biaxial stressing the strand-forming regions 78 become attenuated and holes appear at the bottoms of the conical depressions 72 at a fairly early stage in the stressing operation. As the stressing continues, the hole thus formed enlarges progressively between the strand-forming regions 78 as they become more attenuated.

Referring to FIG. 8, when the biaxial stressing ceases an openwork structure as depicted is obtained in which each small boss 80 (formed from boss-forming areas 74 in FIG. 7)

has extending from it 4 fully attenuated strands 82, two of which are connected to 2 other small bosses 80 and 2 of which are connected to 2 large bosses 84. The large bosses 84 are formed from boss-forming areas 76 in FIG. 7 and have 8 fully attenuated strands extending from them connecting them to 8 small bosses 80.

Clearly many other modifications than those described may be effected within the scope of the invention.

The invention will now be further described by reference to the following examples:

EXAMPLE I

A high-density polyethylene was extruded to form a sheet having a pattern as shown in FIG. 1 of the drawings and having the following dimensional characteristics:
Thickness of large oct. bosses 12=0.007 in.
Thickness of small square bosses 14=0.005 in.
Thickness of thinner material 20=0.0023 in.
Distance between centers of two adjacent oct. bosses 12=0.040 in.
Length of side (at base) of square boss 14=in. ins.
The sheet was stretched in the following sequence,
  i. 30 percent in the machine direction
  ii. 150 percent in the transverse direction
  iii. 100 percent in the machine direction
An openwork structure having a geometry as shown in FIG. 2 of the drawings was obtained in a yield at 30 square yards per pound. The structure had the following physical characteristics:

| Tensile strength (lbs./in.) | MD | 4.1 |
|---|---|---|
| | TD | 2.6 |
| Tear strength (g.) | MD | 80 |
| Brust strength (p.s.i.) | | 12 |

EXAMPLE II

A polypropylene polymer was extruded into a sheet and embossed with a pattern as shown in FIG. 7 of the drawings. The sheet has the following dimensional characteristics:
Thickness of sheet =0.011 in.
Diameter of mouth of conical depression 72=0.020 in.
Depth of conical depression 72=0.010 in.
Distance between centers of adjacent depressions =0.028 in.
The sheet was then stretched in the following sequence,
  i. 70 percent in the machine direction
  ii. 200 percent in the transverse direction
  iii. 80 percent in the machine direction
An openwork structure having a geometry as shown in FIG. 8 was obtained. The structure had the following physical characteristics:

| Tensile (lbs./in.) | MD | 12.7 |
|---|---|---|
| | TD | 13.2 |
| Tear trength (g.) | MD | 210 |
| | TD | 200 |
| Burst strength (p.s.i.) | | 29 |

We claim:

1. A nonwoven openwork net structure of thermoplastic material, comprising a plurality of bosses arranged in a plurality of rows extending substantially uniformly throughout the structure, and bands of thermoplastic material integrally joining substantially all of said bosses to at least two other bosses, said bosses being of at least two different configurations, and the area of the structure between the bosses and the bands being substantially devoid of thermoplastic material.

2. A structure according to claim 1, wherein all of said bosses are integrally joined to at least four other bosses by bands of thermoplastic material.

3. A structure according to claim 1, comprising a plurality of octagonally shaped bosses arranged in a regular pattern one at each intersection of an imaginary squared lattice or grid, and a plurality of square-shaped bosses, arranged in a regular pattern one at the center of each square of said imaginary lattice or grid, each of the square-shaped bosses being connected to four adjacent octagonally shaped bosses and each octagonally shaped boss being connected to four square-shaped bosses and to four octagonally shaped bosses.

4. The structure according to claim 1, comprising a regular pattern of octagonal bosses, hexagonal bosses and square bosses all interconnected by bands of thermoplastic material.

5. A structure according to claim 1, comprising a regular pattern of a plurality of square bosses and a plurality of bosses each of which is shaped like two squares spaced apart but joined by a connecting piece.

6. A structure according to claim 1, comprising a regular pattern of bosses of two different configurations, the bosses of one configuration being approximately square and each being integrally connected by bands to eight smaller substantially square bosses, each of said smaller bosses being integrally connected to two of said larger bosses and two of said smaller bosses.

7. A structure according to claim 1, wherein the bands joining the bosses are of different thickness.

8. A nonwoven openwork net structure of thermoplastic material, comprising at least one portion having a plurality of bosses arranged in a plurality of rows extending substantially uniformly throughout said at least one portion and bands of thermoplastic material integrally joining substantially all of said bosses to at least two other bosses, said bosses being of at least two different configurations; and at least one other portion having a plurality of bosses arranged in a plurality of rows extending substantially uniformly throughout said at least one other portion, and bands of thermoplastic material integrally joining substantially all of said bosses to at least two other bosses, all said bosses in said at least one other portion being of substantially the same configuration, and the area of the structure between the bosses and the bands being substantially devoid of thermoplastic material.

9. A structure according to claim 8, wherein each boss in said at least one other structure is integrally joined to four or six other such bosses by bands of thinner material.

10. A method of producing an openwork net structure of thermoplastic material comprising a plurality of bosses which are of at least two different configurations and arranged in a plurality of rows extending substantially uniformly throughout the structure with bands integrally joining substantially all of said bosses to at least two other bosses, said method comprising biaxially stressing a sheet of thermoplastic material having a regular pattern of bosses of at least two different configurations on at least one surface thereof, until the material takes on a degree of permanent set and splits occur in the thinned material.

* * * * *